US012739563B2

(12) United States Patent
Park et al.

(10) Patent No.: US 12,739,563 B2
(45) Date of Patent: Sep. 15, 2026

(54) AUDIO OUTPUT SYSTEM AND METHOD

(71) Applicant: KOKOZI CO., LTD, Seoul (KR)

(72) Inventors: Ji Hee Park, Seoul (KR); Ki Un Choi, Seoul (KR)

(73) Assignee: KOKOZI CO., LTD, Seoul (KR)

( * ) Notice: Subject to any disclaimer, the term of this patent is extended or adjusted under 35 U.S.C. 154(b) by 127 days.

(21) Appl. No.: 18/862,542

(22) PCT Filed: Apr. 27, 2023

(86) PCT No.: PCT/KR2023/005814
§ 371 (c)(1),
(2) Date: Nov. 3, 2024

(87) PCT Pub. No.: WO2023/214739
PCT Pub. Date: Nov. 9, 2023

(65) Prior Publication Data

US 2025/0287148 A1 Sep. 11, 2025

(30) Foreign Application Priority Data

May 6, 2022 (KR) ........................ 10-2022-0056147

(51) Int. Cl.
*A63H 3/28* (2006.01)
*H04R 1/02* (2006.01)
*H04R 3/12* (2006.01)

(52) U.S. Cl.
CPC ............... *H04R 3/12* (2013.01); *H04R 1/028* (2013.01); *A63H 3/28* (2013.01); *H04R 2420/05* (2013.01)

(58) Field of Classification Search
CPC .......... A63H 3/28; A63H 33/26; A63H 33/42; A63H 2200/00; A63F 13/23; A63F 13/235
See application file for complete search history.

(56) References Cited

U.S. PATENT DOCUMENTS 6,190,174 B1 * 2/2001 Lam ........................ A63H 33/42 463/43
6,460,851 B1 * 10/2002 Lee ..................... A63F 3/00643 273/238

(Continued)

FOREIGN PATENT DOCUMENTS

KR 100894569 B1 4/2009
KR 20180022431 A 3/2018

(Continued)

OTHER PUBLICATIONS

European Search Report for Application No. 23799622.8-1218 mailed May 28, 2025.

(Continued)

*Primary Examiner* — Kurt Fernstrom
(74) *Attorney, Agent, or Firm* — Perilla Knox & Hildebrandt LLP; Thomas B. Hildebrandt

(57) ABSTRACT

An audio output system comprising: an audio output device configured to output different pieces of audio content in accordance with sound figures; a user device configured to control the audio output device through an application; and a shadow device connected to the user device and the audio output device through communication networks, respectively, and configured to store control information for the user device to control the audio output device, wherein the control information includes current state information that represents a current state related to an output of the audio content of the audio output device and specific state information for changing the state of the audio output device to a specific state desired by a user, and wherein the user device is configured to be provided with the current state information that represents the current state from the shadow device and to provide the specific state information for changing the (Continued)

state of the audio output device to the specific state to the shadow device.

10 Claims, 13 Drawing Sheets

(56) References Cited

U.S. PATENT DOCUMENTS

| | | | | |
|---|---|---|---|---|
| 6,659,836 | B1 * | 12/2003 | Yamasaki | G09B 1/06 446/175 |
| 8,460,051 | B2 * | 6/2013 | Rudell | A63H 23/16 446/175 |
| 9,770,651 | B2 * | 9/2017 | Olson | A63F 13/77 |
| 11,113,986 | B2 * | 9/2021 | Cheng | G06F 3/0321 |
| 11,559,751 | B2 * | 1/2023 | Trickett | A63H 18/16 |
| 11,660,548 | B2 * | 5/2023 | Faßbender | A63H 33/26 446/129 |
| 11,669,134 | B2 * | 6/2023 | Miki | G06K 7/10356 463/39 |
| 12,508,517 | B2 * | 12/2025 | Bulman | A63H 3/28 |
| 2009/0315258 | A1 * | 12/2009 | Wallace | A63F 3/00643 273/238 |
| 2015/0375115 | A1 * | 12/2015 | Bunting | A63F 13/214 463/29 |
| 2018/0078863 | A1 * | 3/2018 | Nielsen | A63F 13/98 |

FOREIGN PATENT DOCUMENTS

| | | | |
|---|---|---|---|
| KR | 20180012561 | A | 10/2018 |
| KR | 101989922 | B1 | 6/2019 |
| KR | 102208256 | B1 | 1/2021 |
| WO | 2014001912 | A2 | 1/2014 |
| WO | 2018213005 | A1 | 11/2018 |

OTHER PUBLICATIONS

International Search Report for International Application No. PCT/KR2023/005814.

Written Opinion for International Application No. PCT/KR2023/005814.

* cited by examiner

AUDIO OUTPUT SYSTEM AND METHOD

CROSS-REFERENCE TO RELATED APPLICATIONS

This is a national phase application under 35 U.S.C. § 371 of International Application No. PCT/KR2023/005814 filed Apr. 27, 2023 entitled "AUDIO OUTPUT SYSTEM AND METHOD," which claims the benefit of and priority to Republic of Korea Patent Application No. 10-2022-0056147 filed May 6, 2022, the contents of both of which being incorporated by reference in their entireties herein.

TECHNICAL FIELD

The disclosure relates to an audio output system and a method for changing a playback state thereof, which provide an operating environment in which various sounds can be easily selected by users including infants and young children, and a convenient control environment in which the playback state of an audio output device can be changed even if the audio output device is in an offline state.

BACKGROUND

The contents set forth in this section merely provide background information on the present embodiment and do not constitute prior art.

With the advancement and miniaturization of electronic devices, such as smartphones and tablets, screen time of users who use digital video devices is gradually increasing. The screen time means time spent sitting or lying down due to the use of the digital video devices, and time for physical and learning activities is excluded therefrom. Such an increase of the screen time may have bad effects on health of adult users, and may have more negative effects on users who are infants and young children. In particular, it may have undesirable effects on cerebral development that users who are infants and young children under 24 months of age are exposed to visual information for a long time, and World Health Organization (WHO) has announced an exposure guide for infants and young children suggesting that infants and young children under 1 year old must not be exposed to an electronic device screen and an electronic device screen exposure for infants and young children of 2 to 5 years old must be limited to 1 hour per day.

On the other hand, auditory stimulation may have beneficial effects on the growth and development of infants and young children who feel and learn about the world through auditory stimulation from the time they are fetuses. Various auditory stimulations have a significant impact on not only the language development but also the development of creativity and imagination of infants and young children. However, although parents desire to convey auditory stimulation to their infants and young children, there is currently a lack of means for capable of stimulating the curiosity of infants and young children who correspond to actual users and providing an easy operating environment to them, and thus the parents eventually provide the auditory stimulation to them together with visual information depending on digital video devices (TVs or smartphones).

Therefore, there has been a need for a system which can provide infants and young children with an easy operating environment in which the infants and young children can select various sounds even without going through parents' digital video devices, and can have beneficial effects on the growth and development of the infants and young children through providing various auditory stimulations to them.

BRIEF SUMMARY

An object of the present disclosure is to provide an audio output system and a method for changing a playback state thereof, which include an operating environment in which various sounds can be easily selected by users including infants and young children.

An object of the present disclosure is to provide an audio output system and a method for changing sound content thereof, which provide a convenient control environment in which a playback state of an audio output device can be changed even if the audio output device is in an offline state.

The objects of the present disclosure are not limited to the objects mentioned above, and other objects and advantages of the present disclosure that have not been mentioned can be understood by the following description and will be more clearly understood by the embodiments of the present disclosure. Further, it will be readily appreciated that the objects and advantages of the present disclosure may be realized by the means set forth in the claims and combinations thereof.

According to some aspects of the disclosure, an audio output system comprises: an audio output device configured to output different pieces of audio content in accordance with sound figures, a user device configured to control the audio output device through an application, and a shadow device connected to the user device and the audio output device through communication networks, respectively, and configured to store control information for the user device to control the audio output device, wherein the control information includes current state information that represents a current state related to an output of the audio content of the audio output device and specific state information for changing the state of the audio output device to a specific state desired by a user, and wherein the user device is configured to be provided with the current state information that represents the current state from the shadow device and to provide the specific state information for changing the state of the audio output device to the specific state to the shadow device.

According to some aspects, the audio output device is configured to provide the current state information to the shadow device through an event bus and to be provided with the specific state information from the shadow device.

According to some aspects, the event bus is configured to: determine whether the audio output device is online or offline, and store the specific state information in a database server as storage specific state information in case that the audio output device is in an offline state and the specific state information is provided to the shadow device through the user device.

According to some aspects, the audio output device is configured to be provided with the storage specific state information from the database server and to change the state of the audio output device to a state that corresponds to the storage specific state in case that the audio output device is changed to an online state.

According to some aspects, the audio output device comprises a memory that stores data of the audio output device therein, wherein in case that the audio output device is in an offline state and the state of the audio output device is changed, the changed state of the audio output device is stored in the memory as the storage current state information, and wherein in case that the audio output device is changed to an online state, the audio output device flushes the storage current state information in the memory onto the shadow device.

According to some aspects, further comprising a backend service configured to provide the specific state information to the shadow device SD and to be provided with the current state information from the shadow device.

According to some aspects, a plurality of different sound figures are provided, and wherein in case that the sound figure is docked, the audio output device is configured to output the audio content in accordance with the current state of the audio output device, and in case that the state of the audio output device is changed based on the specific state, the audio output device is configured to change an output method in accordance with the changed state of the audio output device.

According to some aspects of the disclosure, a method for outputting audio content comprising the steps of: being provided with current state information for an audio output device through an event bus, being provided with specific state information for changing a state of the audio output device through a backend service, providing the specific state information to the audio output device through the event bus, and providing the current state information to a user device through the backend service, wherein the step of being provided with the specific state information and the step of providing the current state information are performed regardless of online/offline of the audio output device.

According to some aspects, the step of being provided with the current state information comprises the steps of: storing the current state information in a memory of the audio output device as storage current state information in case that the audio output device is in an offline state; and being provided with the storage current state information that is stored in the memory in case that the audio output device is changed to an online state.

According to some aspects, the step of providing the specific state information comprises the steps of: storing the specific state information in a database server through the event bus as storage specific state information in case that the audio output device is in an offline state; and providing the storage specific state information to the audio output device through the event bus in case that the audio output device is changed to an online state.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The audio output system and the method for changing sound content thereof according to an embodiment of the present disclosure can stimulate the curiosity of infants and young children, and can provide infants and young children with an easy operating environment in which the infants and young children can select various sounds even without going through parents' digital video devices. That is, the audio output system and the method for changing the playback state thereof according to an embodiment of the present disclosure can have beneficial effects on the growth and development of infants and young children through providing various auditory stimulations to them while minimizing a visual exposure to the digital video devices.

Further, the audio output system and the method for changing a playback state thereof according to an embodiment of the present disclosure can support the control and management of an audio output device more easily by providing a convenient service environment in which the playback state of the audio output device can be changed even if the audio output device is in an offline state.

DETAILED DESCRIPTION

Figure 1:
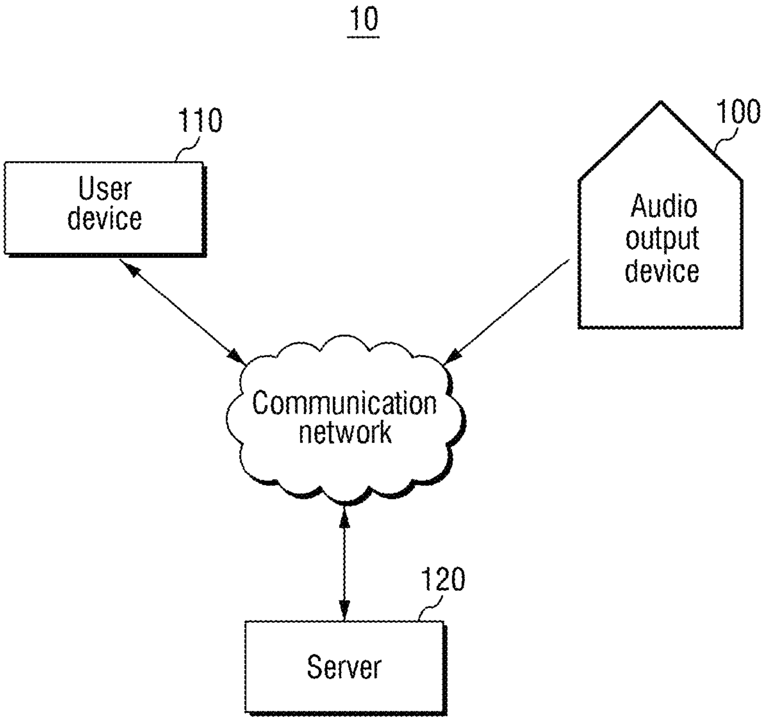
FIG. 1 is a schematic diagram illustrating an audio output system according to an embodiment of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, with reference to FIGS. 1 to 8, an audio output system and a method for changing sound content thereof according to an embodiment of the present disclosure will be described.

Figure 2:
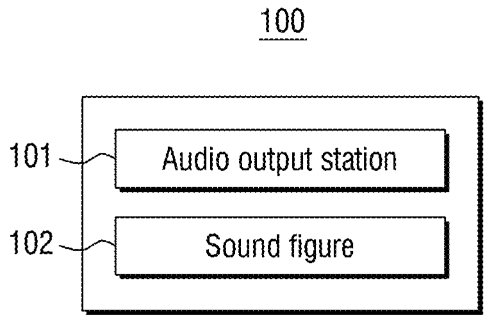
FIG. 2 is a block diagram illustrating the constitution of an audio output device according to an embodiment of the present disclosure.
Figure 3:
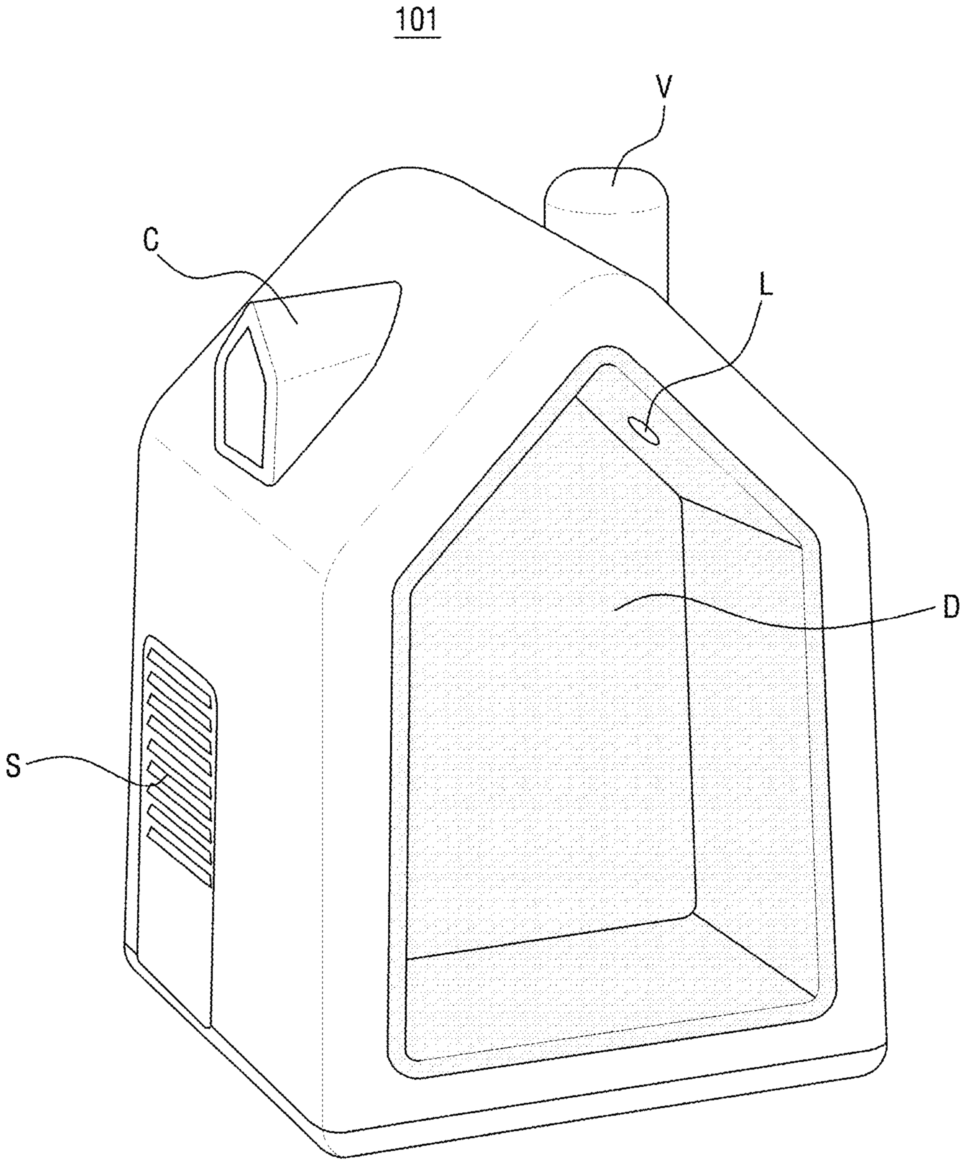
FIG. 3 exemplarily illustrates an appearance of an audio output station.
Figure 4:
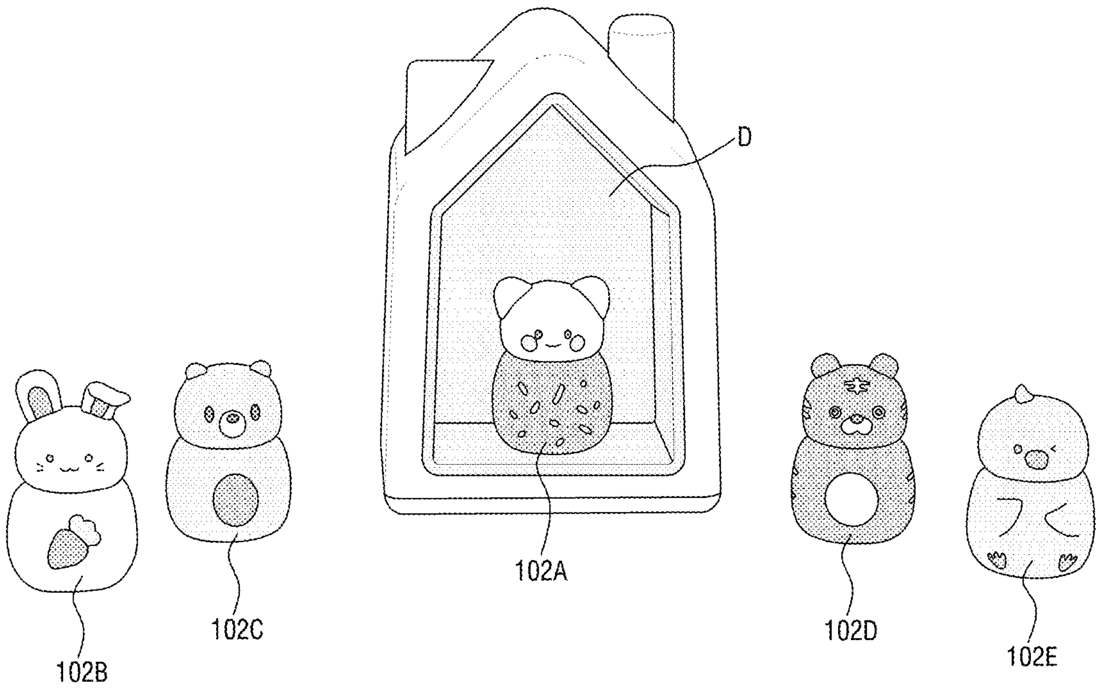
FIG. 4 exemplarily illustrates an audio output station and a plurality of sound figures.

FIG. 1 is a schematic diagram illustrating an audio output system according to an embodiment of the present disclosure. FIG. 2 is a block diagram illustrating the constitution of an audio output device according to an embodiment of the present disclosure. FIG. 3 exemplarily illustrates an appearance of an audio output station. FIG. 4 exemplarily illustrates an audio output station and a plurality of sound figures.

Referring to FIG. 1, an audio output system 10 according to an embodiment of the present disclosure includes an audio output device 100, user device 110, and a server 120.

The audio output device 100 is configured to output sound content that is changed by a user.

The user device 110 may be connected to the audio output device 100, and may control the audio output device 100. The user device 110 means a communication terminal which can use a web service in a wired/wireless communication environment or which can operate an app that provides a service of the server 120. For example, the user device 110 may be a user's personal computer or a portable terminal.

Here, users of the audio output device 100 and users of the user device 110 may include infants and young children and their parents. In the present specification, users who are infants and young children may mean infants who are equivalent to children under 3 years old and young children from 3 to 8 years old. The infant or the young child may be a main user of the audio output device 100, and the parent may be a main user of the user device 110. However, this explanation is merely exemplary, and the embodiments are not limited thereto.

The server 120 may provide a service environment in which the user device 110 controls the audio output device 100, and may provide sound content that is outputted by the audio output device 100. That is, the server 120 may perform hosting of sound content, and may provide the sound content that matches information that is recognized through the audio output device 100 to the audio output device 100.

A communication network may connect the server 120, the audio output device 100, and the user device 110 with one another. For example, the communication network provide an access path so that the user device 110 can transmit and receive packet data after accessing the server 120 and/or the audio output device 100. The communication networks may include, for example, wired networks, such as local area networks (LANs), wide area networks (WANs), metropolitan area networks (MANs), and integrated service digital networks (ISDNs), or wireless networks, such as wireless LANs, CDMA, Bluetooth, satellite communications, 3G, 4G, and 5G, but the scope of the present disclosure is not limited thereto.

Referring to FIG. 2, the audio output device 100 includes an audio output station 101 and a sound FIG. 102.

The user may dock the sound FIG. 102 to the audio output station 101, and as the sound FIG. 102 is docked to the audio output station 101, corresponding sound content is outputted. That is, the sound FIG. 102 plays a key role of sound content playback.

The audio output station 101 may have an appearance in which a docking space D is formed to allow the sound FIG. 102 to be seated therein, and may include a speaker configured to output the sound content, a volume control device V configured to control the volume of the speaker, an operating state light L that indicates the operating state of the audio output station through a color change, and a playback track controller C configured to change a sound track being outputted. For example, the operating state light L may light up or may be turned off depending on whether the sound FIG. 102 is docked. Further, the audio output station 101 may have an appearance that can stimulate the curiosity of the user who is the infant or a young child. Referring to FIG. 3, it can be known that the audio output station 101 may have the same appearance as a house in which the docking space D is formed, the volume control device V is constituted as the chimney of the house, and the playback track controller C is constituted as a part of the roof of the house. The user who is an infant or a young child can locate the sound FIG. 102 in the docking space of the audio output station 101 while purely recognizing that the sound FIG. 102 resides in the audio output station 101. The audio output station 101 in the shape of a house can give the user who is an infant or a young child emotional stability and satisfaction.

The sound FIG. 102 may correspond to the sound content constituted for auditory stimulation of infants and young children. In an embodiment, the sound content may be at least one of content for language learning, such as counting of figures, bilingual repetition, onomatopoeia repetition, and mimetic word repetition; content for improving user's imagination and creativity, such as melody, sound theater, and folktales; content for enabling a user to perform physical activities through rhythm, such as animal songs and rhythmic children's songs; and content in which parents have recorded their voices for user's emotional development. One sound content may be composed of a plurality of sound tracks, and each sound track may be the same type auditory stimulus sound.

In an embodiment, a plurality of sound FIG. 102 with different appearances may be provided, and in this case, the plurality of sound FIG. 102 may correspond to different types of plural pieces of sound content. That is, the plurality of sound FIG. 102 with different appearances may be constituted to correspond to different types of auditory stimulus sound content of infants and young children. One of the plurality of sound FIG. 102 may be selected by the user, and may be seated in the docking space D. The docking space D of the audio output station 101 and the sound FIG. 102 may include magnets, and may be fixed to each other by magnetism, but such a fixing means is not limited to the magnetism. The plurality of sound FIG. 102 may be formed with a size that is large enough for the user who is an infant or a young child to hold with one hand, and the docking space D may be formed with a size that sufficiently accommodates the sound FIG. 102 therein. The plurality of sound FIG. 102 may be constituted to have different shapes, and may be constituted in one of an animal shape, a cute character shape, and a widely known character shape so as to be able to stimulate the curiosity of the user who is an infant or a young child. Further, for safety of the user who is an infant or a young child, the plurality of sound FIG. 102 may be formed with their edges rounded rather than sharp.

Referring to FIG. 4, it can be known that the overall appearance of the plurality of sound FIG. 102 is round, and the FIG. 102 are constituted to have different shapes, such as a cute character 102A, a rabbit 102B, a bear 102C, a tiger 102D, and a chick 102E. Further, the sound FIG. 102 may correspond to different pieces of auditory stimulus sound content of infants and young children in a manner that, for example, the cute character 102A is constituted to correspond to the content in which the parent's voice is recorded, the rabbit 102B is constituted to correspond to Korean and English world masterpiece fairytale content, the bear 102C is constituted to correspond to Korean and English children's songs, the tiger 102D is constituted to correspond to folktales, and the chick 102E is constituted to correspond to rhythmic children's songs.

The user who is an infant or a young child can safely select the sound FIG. 102 with one hand, can easily make the selected sound FIG. 102 seated in the docking space of the audio output station 101, and may also be able to remove the seated sound FIG. 102 with one hand.

The audio output station 101 may identify the seated sound FIG. 102 through near field communication (NFC). The plurality of sound FIG. 102 may include NFC tags, respectively, and the docking space D may include an NFC reader.

The audio output station 101 may include a data processing unit, a data storage unit, and a communication unit. The data processing unit may control processes of recognizing whether the sound FIG. 102 is docked, identifying the NFC tag of the docked sound FIG. 102, and outputting the sound content corresponding to the identified sound FIG. 102. The data storage unit may store data required in the operating process of the data processing unit. The communication unit may perform data exchange with the data processing unit and the server 120.

The data processing unit may check the overall operating state of the audio output station 101, such as whether the sound FIG. 102 is docked and power management, and may reflect the checked state in the operating state light L. Further, the data processing unit may control to output the sound content corresponding to the identified sound FIG. 102 through the speaker S. Specifically, the data processing unit may check whether the sound content corresponding to the identified sound FIG. 102 is stored in the data storage unit of the audio output station 101. If the corresponding sound content is not stored, the data processing unit may request the corresponding sound content from the server 120 through the communication unit, may be provided with the corresponding sound content from the server 120, and may store the provided sound content in the data storage unit. The data processing unit may be provided with the sound content corresponding to the identified sound FIG. 102 from the data storage unit, and may output the provided sound content through the speaker S.

In another example, the sound content may be included in the sound FIG. 102. The data processing unit may be provided with the sound content included in the sound FIG. 102 through the near field communication, and may output the provided sound content through the speaker S.

The audio output device 100 may output the sound content corresponding to the sound FIG. 102 as the sound FIG. 102 is docked to the audio output station 101. Further, as the docked sound figure is removed from the docking space, the output of the sound content may be stopped, and if another sound figure is docked, the sound content corresponding to the docked sound figure is outputted. The sound content output process of the audio output device 100 is composed of simple docking and removal processes only, and thus the users who are infants and young children may also be able to sufficiently perform the operation process. Further, since the sound content can be stored in the audio output station 101 in advance even without any connection with other devices, the output of the sound content corresponding to the sound FIG. 102 can be performed only by the audio output device 100.

According to some embodiments, in case that the same sound FIG. 102 is repeatedly docked to and is removed from the audio output station 101, the audio output station 101 may continuously play the sound content. In other words, in case that the sound FIG. 102 is removed from the docking space D, and then is docked thereto again, the audio output station 101 can continuously play the sound content that was outputted before the sound FIG. 102 is removed from the docking space D. For example, in case that the sound figure of the rabbit 102B has been docked in the audio output station 101, the audio output station 101 may output the sound content corresponding to the sound figure of the rabbit 102B. In this case, if the sound figure of the rabbit 102B is removed from the audio output station 101, the audio output station 101 may temporarily stop the playback of the sound content corresponding to the sound figure of the rabbit 102B. If the sound figure of the rabbit 102B is docked again to the audio output station 101, the audio output station 101 may output the sound content that corresponds to the sound figure of the rabbit 102B again from the point where the sound content was previously stopped.

According to some embodiments, the sound FIG. 102 may change the corresponding sound content. That is, at least one of the number, the types, and the order of sound tracks included in the sound content may be changed by the user. The change of the sound content may be performed by the user who accesses the service environment that is provided by the server 120 through the user device 110. The user may provide a request to change the sound content and data related to a newly added sound track to the server 120 through the user device 110, and the server 120 may change the sound content that corresponds to the sound figure by providing the data provided from the user device 110 to the audio output station 101.

Here, the change of the sound content that corresponds to the sound FIG. 102 may be determined in consideration of the operating state of the audio output station 101. Further, in case that a plurality of sound FIG. 102 are provided, the plurality of sound FIG. 102 may include a first sound figure (rewritable) constituted to correct or rewrite the sound content that corresponds to the plurality of sound FIG. 102 and a second sound figure of which the sound content is unable to be changed. The sound content that corresponds to the first sound figure is rewritable, but the sound content that corresponds to the second sound figure is in a designated state, and thus is unchangeable. Exemplarily, among the plurality of sound FIGS. 102A to 102E of FIG. 4, the cute character sound FIG. 102A may correspond to the first sound figure, and the remaining sound FIGS. 102B to 102E may correspond to the second sound figures. In a state where the first sound figure is docked to the audio output station 101, the change of the corresponding sound content may be performed, whereas in a state where the second sound figure is docked to the audio output station 101, the change of the corresponding sound content may not be performed. However, the explanation of the first sound figure and the second sound figures is merely exemplary, and the embodiments are not limited thereto. Of course, the second sound figure may also be implemented so that the change of the corresponding sound content is performed. For example, the first sound figure may be implemented so that the recorded sound content recorded by the user can be uploaded, and the second sound figure may be implemented so that the corresponding sound content can be changed through subscription or downloading of the content server.

Figure 5:
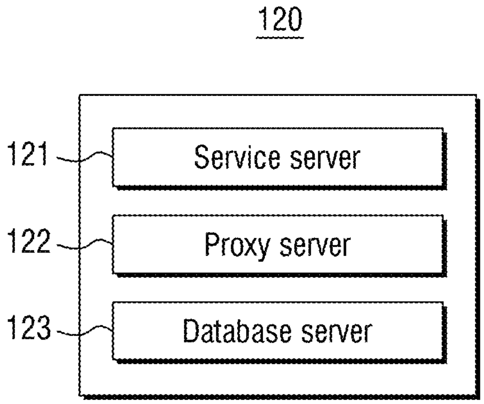
FIG. 5 is a block diagram illustrating the constitution of a server according to an embodiment of the present disclosure.

FIG. 5 is a block diagram illustrating the constitution of a server according to an embodiment of the present disclosure. Referring to FIG. 5, a server 120 includes a service server 121, a proxy server 122, and a database server 123.

The server 120 according to an embodiment may have aspects that are wholly hardware, or that are partly hardware and partly software. For example, the service server 121, the proxy server 122, and the database server 123 included in the server 120 may refer collectively to devices for sending and receiving data of specific format and contents through electronic communications and software related to the devices. In the present specification, the term "unit", "module", "server", "system", "device", or "equipment" is intended to refer to a combination of hardware and software that is driven by the corresponding hardware. Here, the hardware may be, for example, a data processing device including a CPU or another processor. Further, the software that is driven by the hardware may refer to a process being executed, object, executable, thread of execution, or program.

The service server 121 may provide a service environment for connection and control of the audio output device 100 to the user device 110, and may provide the sound content requested from the audio output device 100.

The proxy server 122 may relay data between the service server 121 and a client of the user device 110. That is, the service server 121 may be located inside a firewall that is constituted by the server 120, and data exchange with an outside is performed optionally through the proxy server 122. The proxy server 122 may store partial information that is requested from the client to the service server 121 by using a cache. Exemplarily, information that the user of the user device 110 has once used through the service environment is stored in the proxy server 122, and if the information is requested again thereafter, the proxy server 122 provides the stored information to the user. Accordingly, network traffics between the server 120 and an external device can be reduced, and the data transmission time can be improved.

The database server 123 is constituted to store data required in the operating process of the proxy server 122 or the service server 121.

The service environment that is provided by the service server 121 to control the audio output device 100 may be provided through an application program having been installed in the user device 110. Here, the application program may include, for example, an app that is executed in mobile equipment (smartphone) or a client program installed in a computer device. However, the application program is not limited thereto, and the service server 121 may send and receive data to and from the user device 110 in a data transmission method through a web document. In this case, the web document refers to arbitrary data that is provided so as to be available for viewing and/or modification by being transmitted through a web site having a specific network address with the type or form thereof unlimited. In this case, the service server 121 may be a web server that provides a web page having a specific uniform resource locator (URL), and the user device 110 can use the service environment that is provided by the service server 121 by accessing the corresponding web page by using a web browser. The web document format may be hypertext markup language (HTML), extensible markup language (XML), JavaScript object notation (JSON), or a format based on other different languages, and is not limited to a specific format. The user may use the service environment that is provided by the service server 121 by accessing the application program or web environment through the user device 110.

The user may register the audio output device 100 connected in the service environment on a user's own account, or may enter basic information or may perform other changes. Further, the user may generate a new sound track through the service environment. Here, the new sound track may be generated by recording the user voice. The user device 110 may further include a recording unit, and the service environment may provide a function of generating the new sound track by recording the user voice through the recording unit. Further, the service environment may invite a user of other user device as a guest user, and may provide a function of generating a new sound track by recording the guest user's voice. That is, the other user invited as the guest user may be set as a family member of the user of the user device 110, and the service server 121 may give the guest user permission to generate a new sound track through voice recording. Through such guest invitation and guest recording functions, voices of other users who live far away may be generated as the sound content, and thus more diverse pieces of auditory stimulation sound content may be provided to the users who are infants and young children.

Further, the service environment may provide a function of changing the sound content corresponding to the sound FIG. 102. Here, in case that a plurality of sound FIG. 102 are provided, a function of modifying the sound content corresponding to the first sound figure may be provided. The service environment may provide a function of modifying at least one of the types, the number, and the order of sound tracks included in the sound content corresponding to the first sound figure.

As the service environment provides the above-described functions, the sound content included in the user device 110 may be changed to correspond to the sound FIG. 102. The user may determine the sound content corresponding to the sound FIG. 102 through a user interface that is provided by the service environment. For example, the user may select the recorded user's voice sound track and the family voice sound track as the sound content corresponding to the sound FIG. 102, and may provide a request to change the selected sound content to the sound content corresponding to the sound FIG. 102 to the server 120. The request to change the sound content may include the sound data corresponding to the sound track in accordance with the user's selection.

Figure 6:
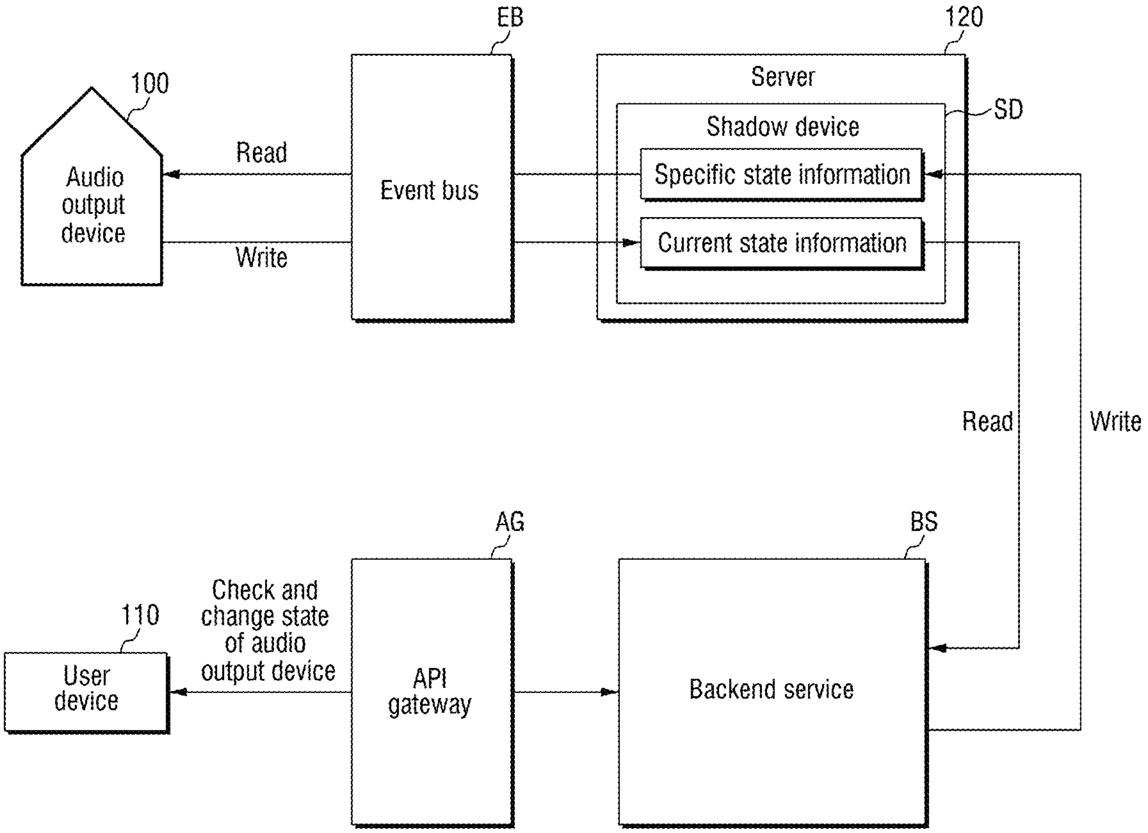
FIG. 6 illustrates an example of a method for changing a state of an audio output system according to an embodiment of the present disclosure.

FIG. 6 illustrates an example of a method for changing a state of an audio output system according to an embodiment of the present disclosure.

An event bus EB and an API gateway AG illustrated in FIG. 6 may be included in the proxy server 122 of FIG. 5, and a backend service BS may be included in the service server 121 of FIG. 5.

Referring to FIG. 6, the user device 110 may recognize the current state of the audio output device 100 through the server 120, and may change the state of the audio output device 100 by transmitting the specific state intended to be changed to the audio output device 100 through the server 120 in accordance with the recognized current state. In this case, the current state of the audio output device 100 may include all states for the audio output device 100 to output the audio content, such as, a playback method (e.g., normal playback, shuffle, repeated playback, and/or random playback), playlist setting, display of online/offline state of the audio output station 101, Wi-Fi environment that is accessed by the audio output station 101, battery level of the audio output station 101, volume setting of the audio output station 101, setting of time required for the audio output station 101 to enter a power saving mode, display of the sound FIG. 102 recognized by the audio output station 101, display of the sound content being played by the audio output station 101, and change of the sound content being played by the audio output station 101. The server 120 of FIG. 6 may mean the proxy server 122, but the embodiments are not limited thereto.

Hereinafter, in the present disclosure, a writing procedure may mean a procedure of storing information of a first object in a second object, and a reading procedure may mean a procedure of reading information stored in a third object from a fourth object.

According to some embodiments, the audio output device 100 may write current state information representing the current state of the audio output device 100 through the event bus (EB). Further, the audio output device 100 may read specific state information representing the specific state for changing the current state that is controlled by the user device 110 through the event bus EB. The audio output device 100 may change the current state to a state that corresponds to the specific state based on the read specific state information. In other words, the specific state may be a state that the user intends to change based on the current state.

The audio output device 100 may output the audio content based on the current state. In this case, if the sound FIG. 102 is docked to the audio output device 100, the audio output device 100 may output the audio content that corresponds to the sound FIG. 102 based on the current state. In this case, the audio output device 100 may output different pieces of audio content in accordance with the sound FIG. 102, and a plurality of different sound FIG. 102 may be provided in accordance with the audio content.

The event bus EB may perform communication with the audio output device 100, and may write the current state of the audio output device 100 in the server 120 by tracking the current state of the audio output device 100, or may read the specific state information for changing the current state of the audio output device 100 to the specific state from the server 120.

Although the event bus EB is illustrated separately from the server 120 in FIG. 6, this is merely for convenience in explanation, and the event bus EB may be included in the server 120.

The server 120 may include a shadow device SD that corresponds to a digital twin object with the audio output device 100. That is, the server 120 may include the shadow device SD that corresponds to the audio output device 100, and may store control information for controlling the audio output device 100.

The control information means information for controlling the operation of the audio output device 100. For example, the control information may include the current state information that represents the current state related to the output of the audio content of the audio output device 100 and the specific state information for changing the state of the audio output device 100 to the specific state desired by the user based on the current state.

The shadow device SD may store therein the current state of the audio output device 100, which is written through the event bus EB, and the specific state information for changing the current state of the audio output device 100, which is written from the API through the backend service BS.

According to some embodiments, the audio output device 100 may store the current state information in the shadow device SD by writing the current state of the audio output device 100 in the shadow device SD through the event bus EB. Further, the audio output device 100 may read the specific state information stored in the shadow device SD through the event bus EB. The audio output device 100 may change the current state of the audio output device 100 by using the specific state information of the shadow device SD that has been read through the event bus EB.

The user device 110 may check the current state information of the audio output device 100 through the API gateway AG and the backend service BS, and may provide the specific state information for changing the current state of the audio output device 100 to the shadow device SD. In other words, the backend service BS may read the current state information of the audio output device 100, which is stored in the shadow device SD, and may provide the read current state to the user device 100 through the API gateway AG. Further, the backend service BS may write the specific state information of the audio output device 100, which is provided from the user device 110 through the API gateway AG, in the shadow device SD.

According to some embodiments, all of the current state information and the specific state information of the audio output device 100 may be written or read through the event bus EB. That is, the event bus EB may record logs of all pieces of audio content that are played by the audio output device 100. In this case, the logs for the all pieces of audio content which are played by the audio output device 100, which are recorded by the event bus EB, may be stored in the database server 123.

Through the above-described method, the user may change the state of the audio output device 100 through the user device 110.

Figure 7:
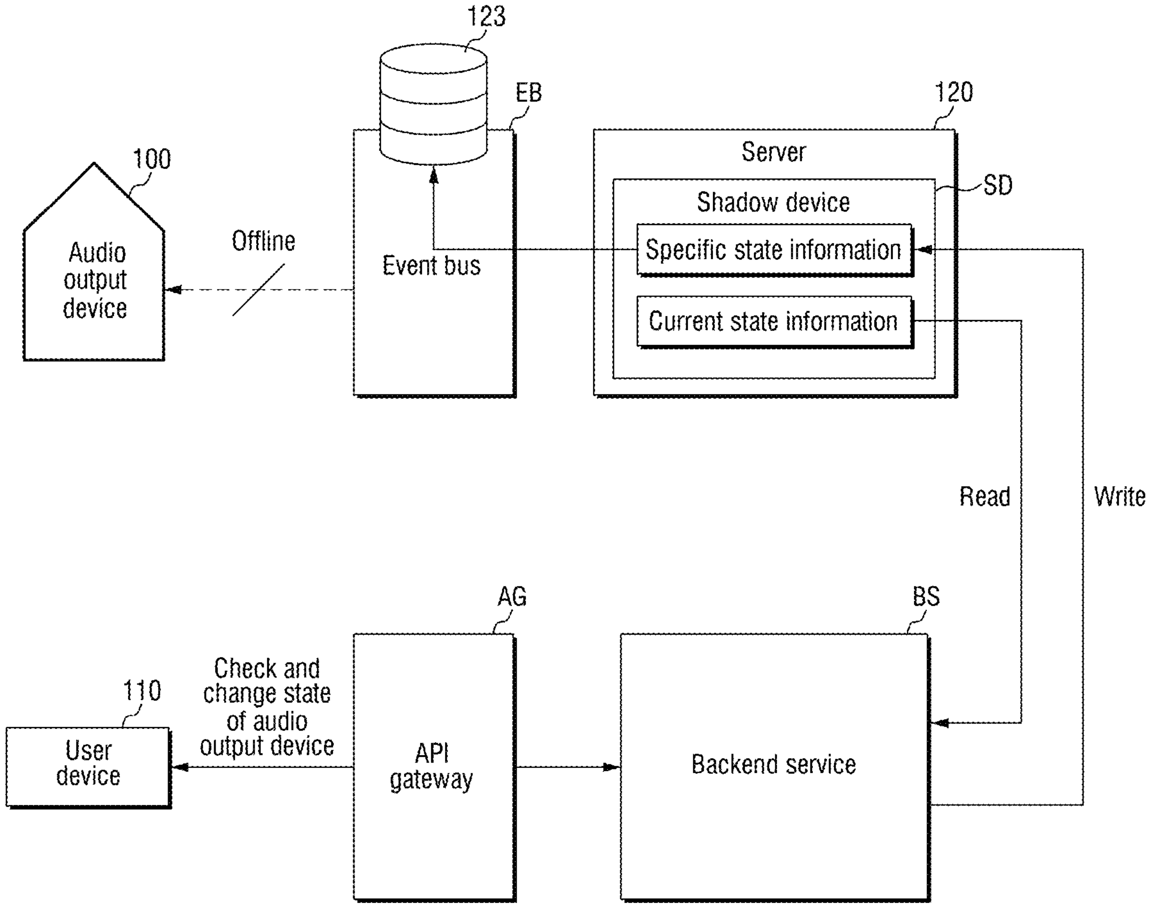
FIGS. 7 and 8 illustrate an example of a method for changing the state of an audio output device 100 in case that the audio output device 100 is offline according to an embodiment of the present disclosure.
Figure 8:
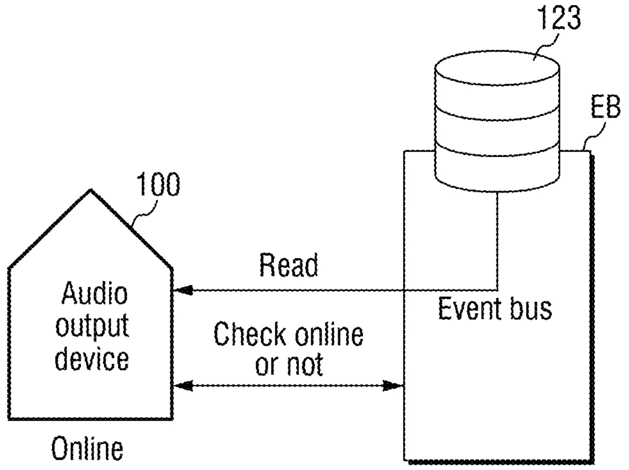

FIGS. 7 and 8 illustrate an example of a method for changing the state of an audio output device 100 in case that the audio output device 100 is offline according to an embodiment of the present disclosure. For convenience in explanation, the contents that are the same as or similar to the above-described contents will be omitted or will be simply explained.

FIG. 7 illustrates a situation in which the audio output device 100 is newly provided with specific state information in an offline state. In case that the audio output device 100 is offline, the audio output device 100 may be unable to communicate with the server 120. However, the communication between the user device 110 and the server 120 may be maintained regardless of the online/offline of the audio output device 100.

Even if the audio output device 100 is offline, the communication between the user device 110 and the server 120 is maintained, and thus the backend service BS may still read the current state information from the shadow device SD, or write the specific state information in the shadow device SD. In other words, the user may check the current state of the audio output device 100, and may write the specific state information in the shadow device SD by providing the specific state for changing the current state of the audio output device 100 to the backend service BS.

In this case, the event bus EB may store the specific state information that is written in the shadow device SD in the database server 123. According to some embodiments, the event bus EB may store the specific state information in the database server 123 as storage specific state information. This may be for the audio output device 100 to distinguish the storage specific state information from the specific state information that is provided in the online state. For example, the distinction of the storage specific state information from the specific state information may be made by using separate indexes or different hash values, but the embodiments are not limited thereto. The storage specific state information that is stored in the database server 123 may be managed as cache data, but embodiments are not limited thereto.

FIG. 8 illustrates a situation in which an audio output device 100 is changed to an online state in a state where storage specific state information is stored in a database server 123. The event bus EB may check whether the state of the audio output device 100 is online periodically or aperiodically. However, the embodiments are not limited thereto, and the present disclosure may also be able to be implemented even in a manner that another constituent element excluding the event bus EB checks whether the state of the audio output device 100 is online periodically or aperiodically, and provides the checked state to the event bus EB. If the state of the audio output device 100 is changed to online, the event bus EB may read the storage specific state information stored in the database server 123 and may provide the read storage specific state information to the audio output device 100. For example, the event bus EB may read the storage specific state information that is cached in the database server 123, and may provide the read information to the audio output device 100. The audio output device 100 may be controlled based on the provided storage specific state information.

Figure 9:
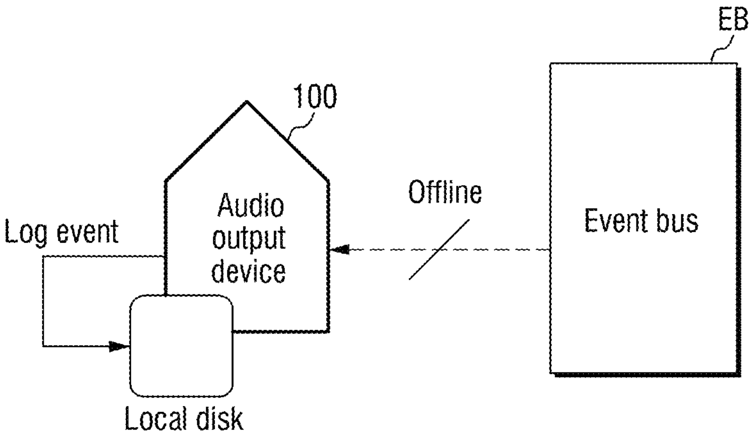
FIGS. 9 and 10 illustrate an example of a method for checking the current state of an audio output device 100 in case that the audio output device 100 is an offline state according to an embodiment of the present disclosure.
Figure 10:
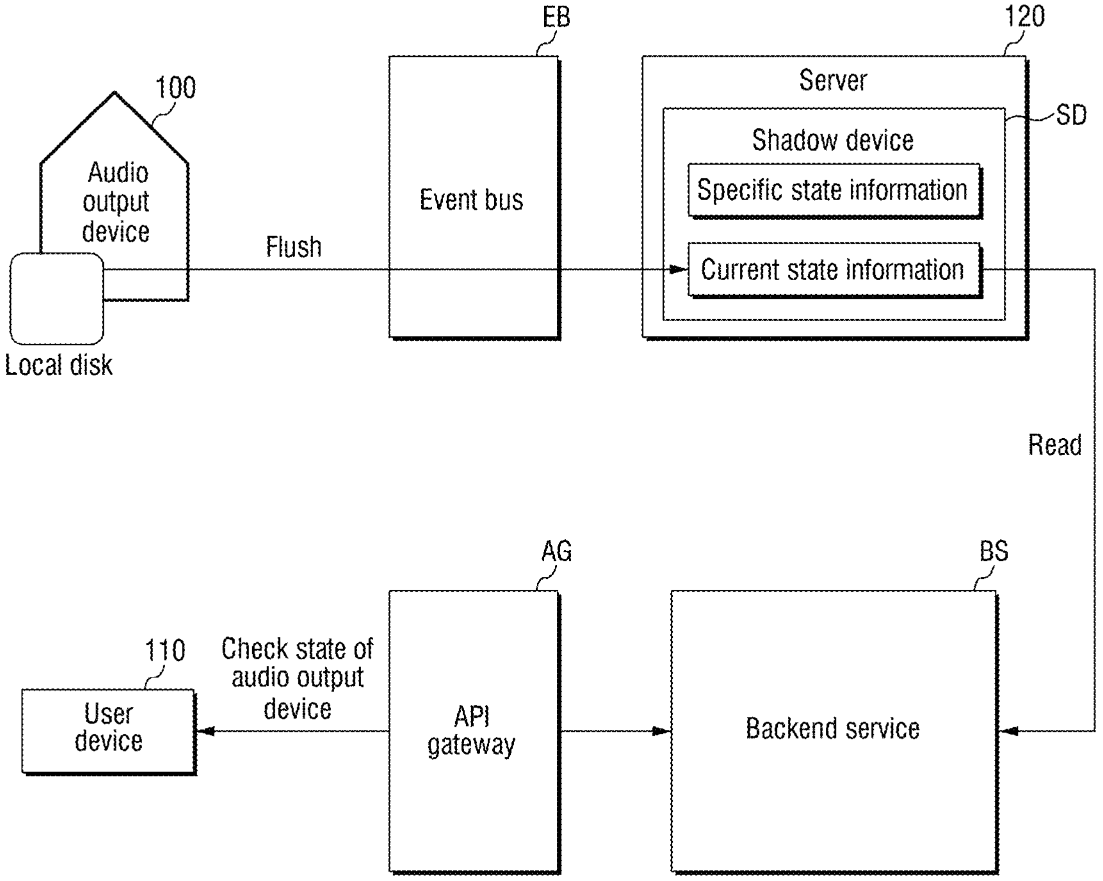

FIGS. 9 and 10 illustrate an example of a method for checking the current state of an audio output device 100 in case that the audio output device 100 is an offline state according to an embodiment of the present disclosure.

FIG. 9 illustrates a case that the current state of the audio output device 100 is changed in a state where the state of the audio output device is offline. If the state of the audio output device 100 is offline, all events (e.g., volume control of the audio output device 100 and the like) that occur on the audio output device 100 may be logged or stored in a local disk (or memory). For convenience in explanation, all events that are stored in the local disk of the audio output device 100 are defined as storage current state information.

FIG. 10 illustrates a situation in which the state of an audio output device 100 is changed to online in a state where storage current state information is stored in a local disk of the audio output device 100. The audio output device 100 may flush the storage current state information that is stored in the local disk onto the shadow device SD through the event bus EB. In other words, if the audio output device 100 is changed to an online state, the audio output device 100 may flush log data stored in the local disk through the event bus EB, and may synchronize the flushed log data with the shadow device SD. That is, the audio output device 100 may update the current state of the shadow device SD onto the shadow device SD through the event bus EB.

Through the above method, the event bus EB may store and manage all events of the audio output device 100 even if the audio output device 100 is in an offline state.

According to some embodiments, the state change of the audio output device 100 may be performed through the event bus EB. In other words, the event bus EB may store and manage changes for all events that occur on the audio output device 100. Accordingly, the all events that are recorded on the event bus EB may be used to grasp the tendency of the user of the audio output device 100, and further, to provide a new service by using the user tendency. For example, through the events stored on the event bus EB, it may be possible to acquire data about the tendency of the user of the audio output device 100, such as what sound FIG. 102 the user mainly uses, and what audio content among the audio content corresponding to specific sound figures the user likes and dislikes. The tendency of the user may be used in various fields, that is, the tendency of the user may be used for a developer to develop a new sound FIG. 102 and audio content, to recommend a sound FIG. 102 that matches the tendency of the user, but is not stored by the user, and to recommend sound content that matches the tendency of the user or to recommend a subscription service to sound content that matches the tendency of the user. The grasping of the tendency of the user may be performed through an artificial intelligence module using big data collected by the event bus EB, but the embodiments are not limited thereto.

Figure 11:
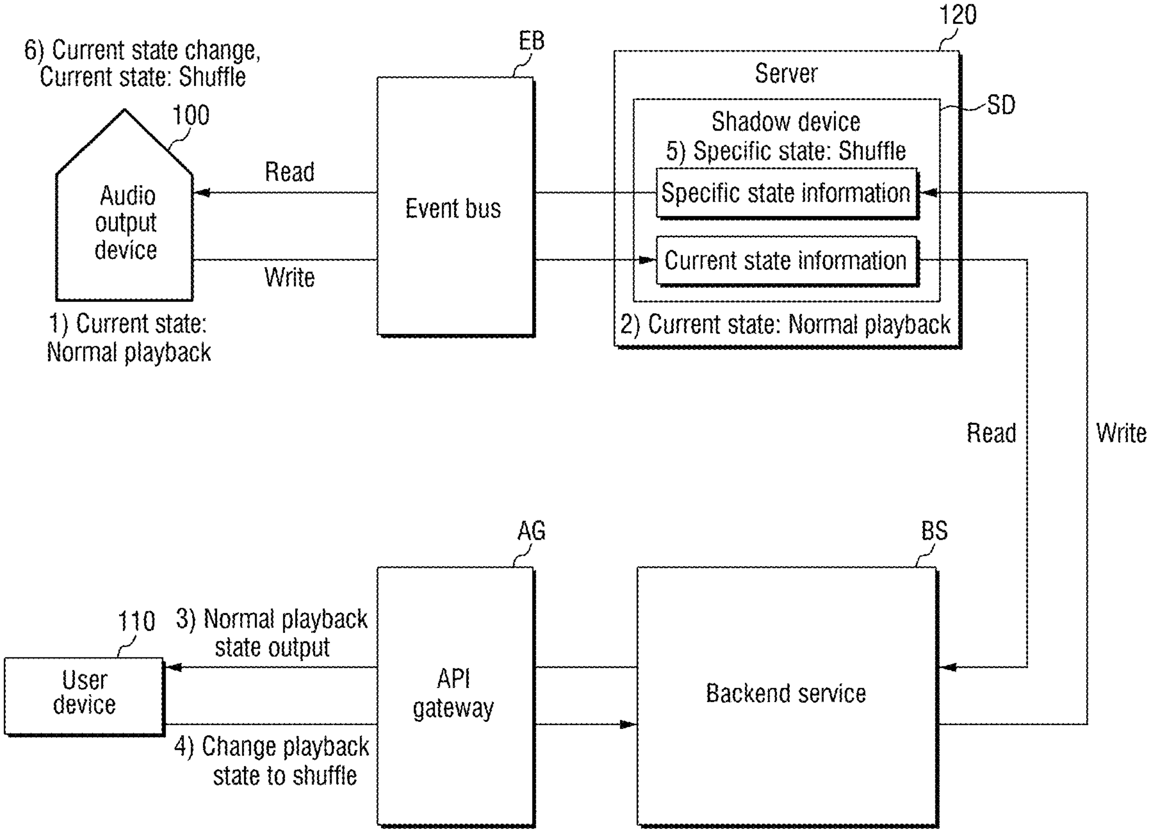
FIG. 11 illustrates an example of a method for changing a playback state of an audio output device 100 according to an embodiment of the present disclosure from a normal playback to a shuffle.

FIG. 11 illustrates an example of a method for changing a playback state of an audio output device 100 according to an embodiment of the present disclosure from a normal playback to a shuffle.

Referring to FIG. 11, if the current state of the audio output device 100 is a normal playback state, it may be changed to a shuffle.

Specifically, 1) the audio output device 100 may play the audio content in a normal playback method after the sound FIG. 102 is docked. In this case, the current state of the audio output device 100 may be a normal playback state.

2) The audio output device 100 may write the current state information of the shadow device SD of the server 120 as a normal playback state through the event bus EB.

3) The backend service BS may read the current state information of the shadow device SD, and may output that the current state of the audio output device 100 is a normal playback state to the user device 110 through the API gateway AG. The user device 110 may check the current state of the audio output device 100 through an application or the like.

4) The user may input specific state information for changing the current state of the audio output device 100 to a shuffle playback state through the user device 110.

5) The specific state information that is input through the user device 110 may be written in the shadow device SD through the backend service BS. The specific state information of the shadow device SD may be updated onto the shuffle state.

6) The event bus EB may read the specific state information that is stored in the shadow device SD, and may provide the read specific state information to the audio output device 100. The audio output device 100 may read the specific state information that is provided through the event bus EB, and may change the playback state of the audio output device 100 to the shuffle.

Figure 12:
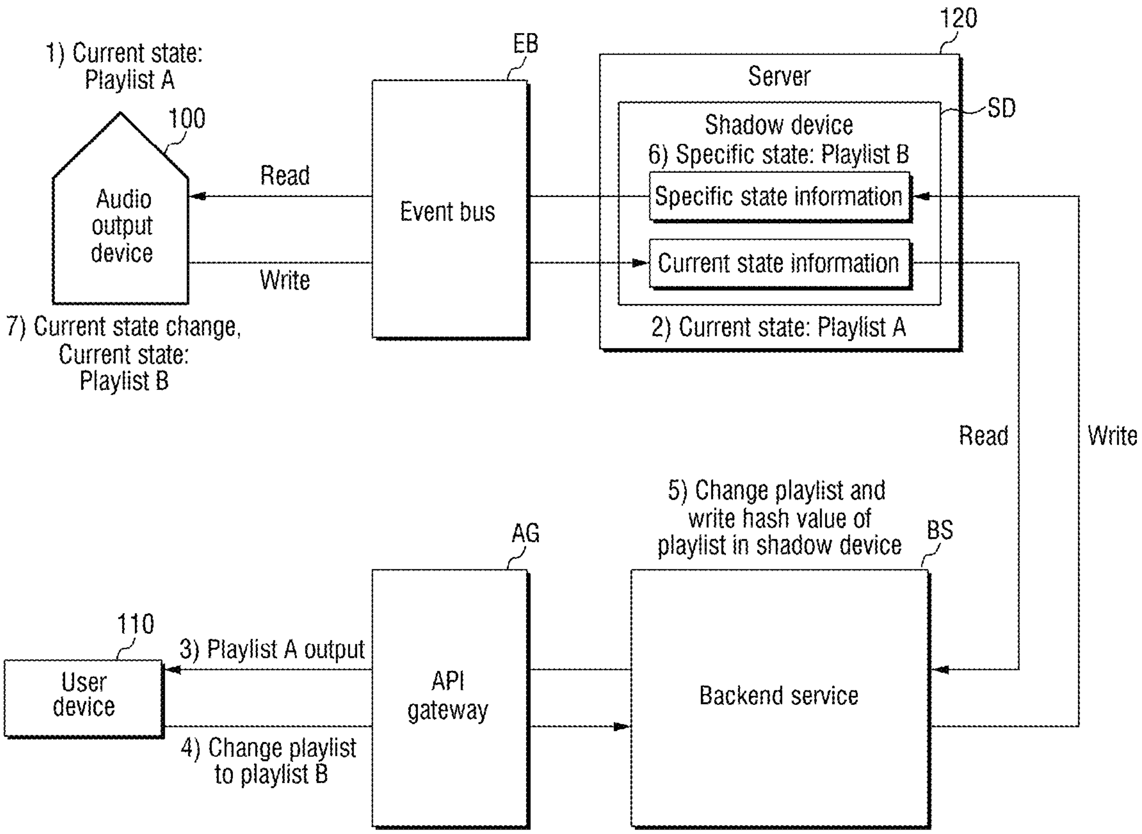
FIG. 12 illustrates an example of a method for changing a playlist of an audio output device 100 according to an embodiment of the present disclosure.

FIG. 12 illustrates an example of a method for changing a playlist of an audio output device 100 according to an embodiment of the present disclosure.

Referring to FIG. 12, the playlist for sound FIG. 102 of the audio output device 100 may be changed.

Specifically, 1) the audio output device 100 may identify the sound FIG. 102 in case that the sound FIG. 102 is docked, and may output playlist A that corresponds to the sound FIG. 102. For example, the playlist A may separately store a hash value, but the embodiments are not limited thereto.

2) The audio output device 100 may write the current state information of the shadow device SD of the server 120 as the playlist A through the event bus EB.

3) The backend service BS may read the current state information of the shadow device SD, and may output that the current state of the audio output device 100 is the playlist A to the user device 110 through the API gateway AG. The user device 110 may check the current state of the audio output device 100 through an application or the like.

4) The user may input specific state information for changing the current state of the audio output device 100 to playlist B through the user device 110. The data that is input through the user device 110 may be provided to the backend service BS through the API gateway AG.

5) The backend service BS may write the playlist B that is provided through the API gateway AG and the corresponding hash value in the shadow device SD as the specific state information.

6) The shadow device SD may update the specific state information onto the playlist B. In this case, the specific state information may further include the hash value for the playlist B, but the embodiments are not limited thereto.

7) The event bus EB may read the specific state information that is stored in the shadow device SD, and may provide the read specific state information to the audio output device 100. The audio output device 100 may read the specific state information that is provided through the event bus EB, and may change the playlist of the audio output device 100 to the playlist B.

Figure 13:
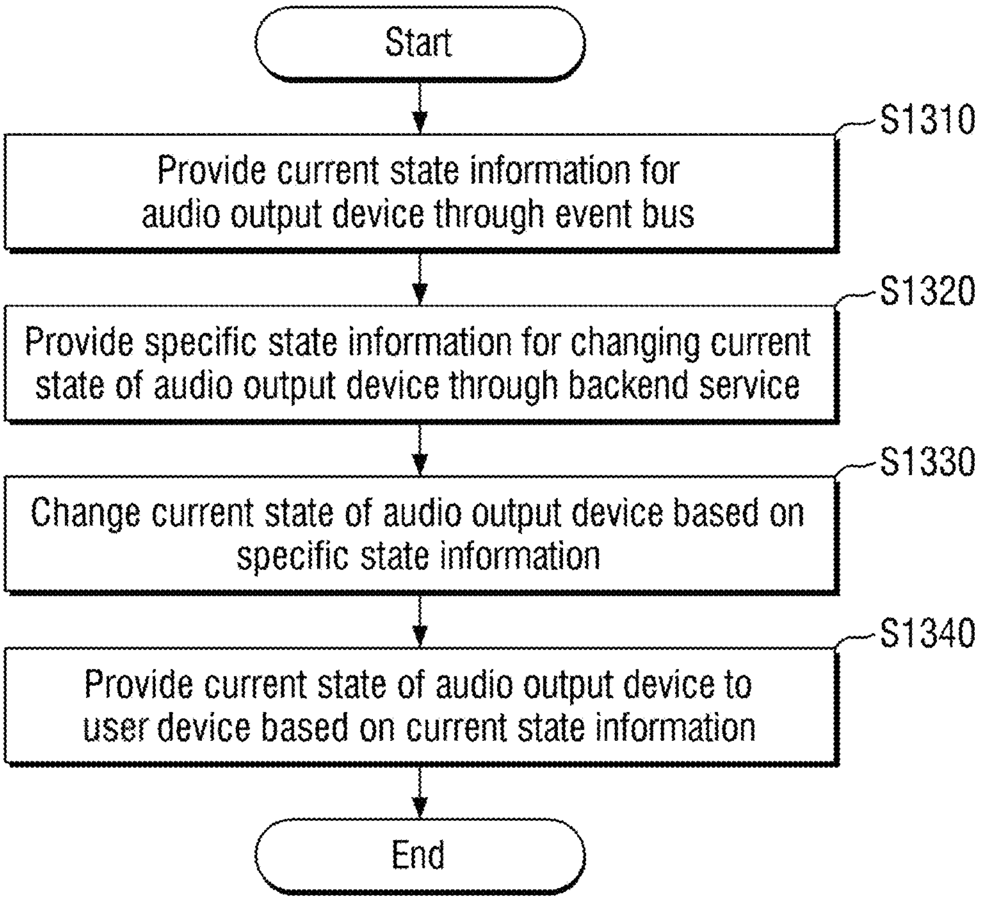
FIG. 13 is a flowchart illustrating an example of a method for changing a state of an audio output device according to an embodiment of the present disclosure.

FIG. 13 is a flowchart illustrating an example of a method for changing a state of an audio output device according to an embodiment of the present disclosure. For convenience in explanation the contents that are the same as or similar to the above-described contents will be omitted or will be simply described.

The method for changing the state of the audio output device 100 according to the present embodiment may be performed by the audio output system 10 according to FIGS. 1 to 12. For explanation of the method for changing the state according to the present embodiment, FIGS. 1 to 7 and the related explanation thereof may be referred to.

Referring to FIG. 13, the shadow device SD may be provided with the current state information from the audio output device 100 through the event bus EB (S1310).

Further, the shadow device SD may be provided with the specific state information for changing the current state of the audio output device 100 from the user device 110 through the backend service BS (S1320).

The audio output device 100 may change the current state of the audio output device 100 based on the specific state information that is stored in the shadow device SD (S1330).

The user device 110 may check the current state of the audio output device 100 based on the current state information that is stored in the shadow device SD (S1340).

The operations by the method for changing the sound content of the audio output system according to the embodiments as described above may be implemented by a computer program at least partly, and may be written in a computer readable recording medium. The computer readable recording medium in which the program for implementing the operations by the method for changing the sound content of the audio output system according to the embodiments is written includes all types of recording devices in which computer readable data is stored. Examples of the computer readable recording medium are flash memory type, hard disk type, multimedia card micro type, and card type memories (e.g., SD or XD memory), RAM, and ROM. Further, in the computer readable recording medium, computer readable codes which are distributed to computer systems connected through networks and which can be read by the computer in a distributed manner may be stored and executed. Further, functional programs, codes, and code segments for implementing the present embodiment will be able to be easily understood by those of ordinary skill in the art to which the present embodiment pertains. The computer program may be composed of a set of instructions that can be executed by the above-described computer, and may have different names depending on the type of the computer. For example, if the computer type is a smartphone, the computer program may be referred to as an app.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

The invention claimed is:

1. An audio output system comprising:

an audio output device configured to output different pieces of audio content in accordance with sound figures;

a user device configured to control the audio output device through an application; and a shadow device configured to communicate with the user device and the audio output device through communication networks, respectively, and store control information for the user device to control the audio output device, wherein the control information includes current state information that represents a current state related to an output of the audio content of the audio output device and specific state information for changing the state of the audio output device to a specific state desired by a user, and wherein the user device is configured to be provided with the current state information that represents the current state from the shadow device and to provide the specific state information for changing the state of the audio output device to the specific state to the shadow device.

2. The audio output system of claim 1, wherein the audio output device is configured to provide the current state information to the shadow device through an event bus and to be provided with the specific state information from the shadow device.

3. The audio output system of claim 2, wherein the event bus is configured to:

determine whether the audio output device is online or offline, and store the specific state information in a database server as storage specific state information in case that the audio output device is in an offline state and the specific state information is provided to the shadow device through the user device.

4. The audio output system of claim 3, wherein the audio output device is configured to be provided with the storage specific state information from the database server and to change the state of the audio output device to a state that corresponds to the storage specific state in case that the audio output device is changed to an online state.

5. The audio output system of claim 1, wherein the audio output device comprises a memory that stores data of the audio output device therein, wherein in case that the audio output device is in an offline state and the state of the audio output device is changed, the changed state of the audio output device is stored in the memory as the storage current state information, and wherein in case that the audio output device is changed to an online state, the audio output device flushes the storage current state information in the memory onto the shadow device.

6. The audio output system of claim 1, further comprising a backend service configured to provide the specific state information to the shadow device SD and to be provided with the current state information from the shadow device.

7. The audio output system of claim 1, wherein a plurality of different sound figures are provided, and wherein in case that the sound figure is docked, the audio output device is configured to output the audio content in accordance with the current state of the audio output device, and in case that the state of the audio output device is changed based on the specific state, the audio output device is configured to change an output method in accordance with the changed state of the audio output device.

8. A method for outputting audio content comprising the steps of:

being provided with current state information for an audio output device through an event bus;

being provided with specific state information for changing a state of the audio output device through a backend service;

providing the specific state information to the audio output device through the event bus; and providing the current state information to a user device through the backend service, wherein the step of being provided with the specific state information and the step of providing the current state information are performed regardless of online/offline of the audio output device.

9. The method of claim 8, wherein the step of being provided with the current state information comprises the steps of:

storing the current state information in a memory of the audio output device as storage current state information in case that the audio output device is in an offline state; and being provided with the storage current state information that is stored in the memory in case that the audio output device is changed to an online state.

10. The method of claim 8, wherein the step of providing the specific state information comprises the steps of:

storing the specific state information in a database server through the event bus as storage specific state information in case that the audio output device is in an offline state; and providing the storage specific state information to the audio output device through the event bus in case that the audio output device is changed to an online state.

* * * * *